United States Patent

[11] 3,539,072

| [72] | Inventors | Charley Ward Hunter<br>Raytown;<br>William C. Hoppe, Kansas City, Missouri |
|---|---|---|
| [21] | Appl. No. | 776,368 |
| [22] | Filed | Nov. 18, 1968 |
| [45] | Patented | Nov. 10, 1970 |
| [73] | Assignee | The Vendo Company<br>Kansas City, Missouri<br>a corporation of Missouri |

[54] STACKED COMPARTMENT DISPENSING MACHINE HAVING RECIPROCABLE COMPARTMENT TRANSFER STRUCTURE
13 Claims, 13 Drawing Figs.

[52] U.S. Cl............................................... 221/76, 221/129
[51] Int. Cl.............................................. G07f 11/00
[50] Field of Search.................................. 221/69, 76—88, 129

[56] References Cited
UNITED STATES PATENTS
2,661,259  12/1953  Rippon.......................... 221/78X
3,393,952  7/1968  Gore.............................. 221/79X

*Primary Examiner*—Samuel F. Coleman
*Attorney*—Schmidt, Johnson, Hovey, Williams & Chase ABSTRACT: A selective product-dispensing machine employs a series of product conveyors each having a pair of separate stacks of compartments. Transport structure common to the conveyors is disposed therebeneath for shifting a released compartment of a selected conveyor from one stack thereof to the bottom of the other stack of the selected conveyor. The transport structure maintains the released compartment in a horizontal attitude at all times and effects raising of only the stack to which the released compartment is transferred.

Patented Nov. 10, 1970

3,539,072

INVENTORS
Charley Ward Hunter
William C. Hoppe

BY Schmidt, Johnson, Hovey,
Williams & Bradley
ATTORNEYS

INVENTORS
Charley Ward Hunter
William C. Hoppe

BY Schmidt, Johnson, Hovey,
Williams & Bradley
ATTORNEYS

INVENTORS
Charley Ward Hunter
William C. Hoppe

INVENTOR
Charley Ward Hunter
William C. Hoppe

BY Schmidt, Johnson, Hovey,
Williams & Bradley
ATTORNEYS 3,539,072

1

STACKED COMPARTMENT DISPENSING MACHINE HAVING RECIPROCABLE COMPARTMENT TRANSFER STRUCTURE

This invention relates to improvements in multiple conveyor article-handling apparatus and, in particular, to a multiple conveyor product-dispensing machine of the type wherein each conveyor comprises a pair of separate stacks of product compartments successively movable through an access station upon incremental shifting thereof.

Stacked compartment product-dispensing machines possess several advantageous features. Since the products are stored in separate individual compartments, crushable or breakable goods may be safely dispensed. A low profile design is possible since the product access station may be nearer the top of the machine than in other types of dispensing and vending equipment. Furthermore, stacked compartment machines are particularly adapted to dispense different products from the same column since the product next to be dispensed can be displayed in an area unaccessible to the consumer and then moved to the access station for removal.

Machines of this type, however, also present problems due to their relatively high cost and the necessity heretofore for the mechanism that effects transfer of the compartments between the stacks to tip the compartments out of a horizontal attitude thereby occasionally causing the machine to jam. Prior art machines also require a relatively large motor to drive the transfer mechanism since one of the stacks of all of the conveyors has to be raised in order for the transferred compartment to be latched beneath the stack to which transfer is effected.

It is, therefore, an important object of this invention to provide stacked compartment article-handling apparatus that maintains a compartment under transfer in a horizontal attitude at all times, thereby minimizing the possibility of the article being spilled from the compartment and jamming the apparatus.

Another important object of this invention is to provide apparatus as aforesaid which raises only the compartments of the stack to which a compartment is being transferred, thereby permitting the use of a relatively small motor to drive the transfer mechanism.

Another important object of the invention is to permit the stacks of compartments of each conveyor to be shifted to an accessible disposition as a unit for cleaning or restocking the same.

A further and important object of the invention is to provide a highly dependable, positive control mechanism for supporting stacked compartments and releasing the lowermost compartment onto a transport therefor when the apparatus is actuated.

Yet another important aim of this invention is to provide individual compartments of simple construction that are compatible with the apparatus of the foregoing objects and that may be manufactured at minimum cost.

Figure 1:
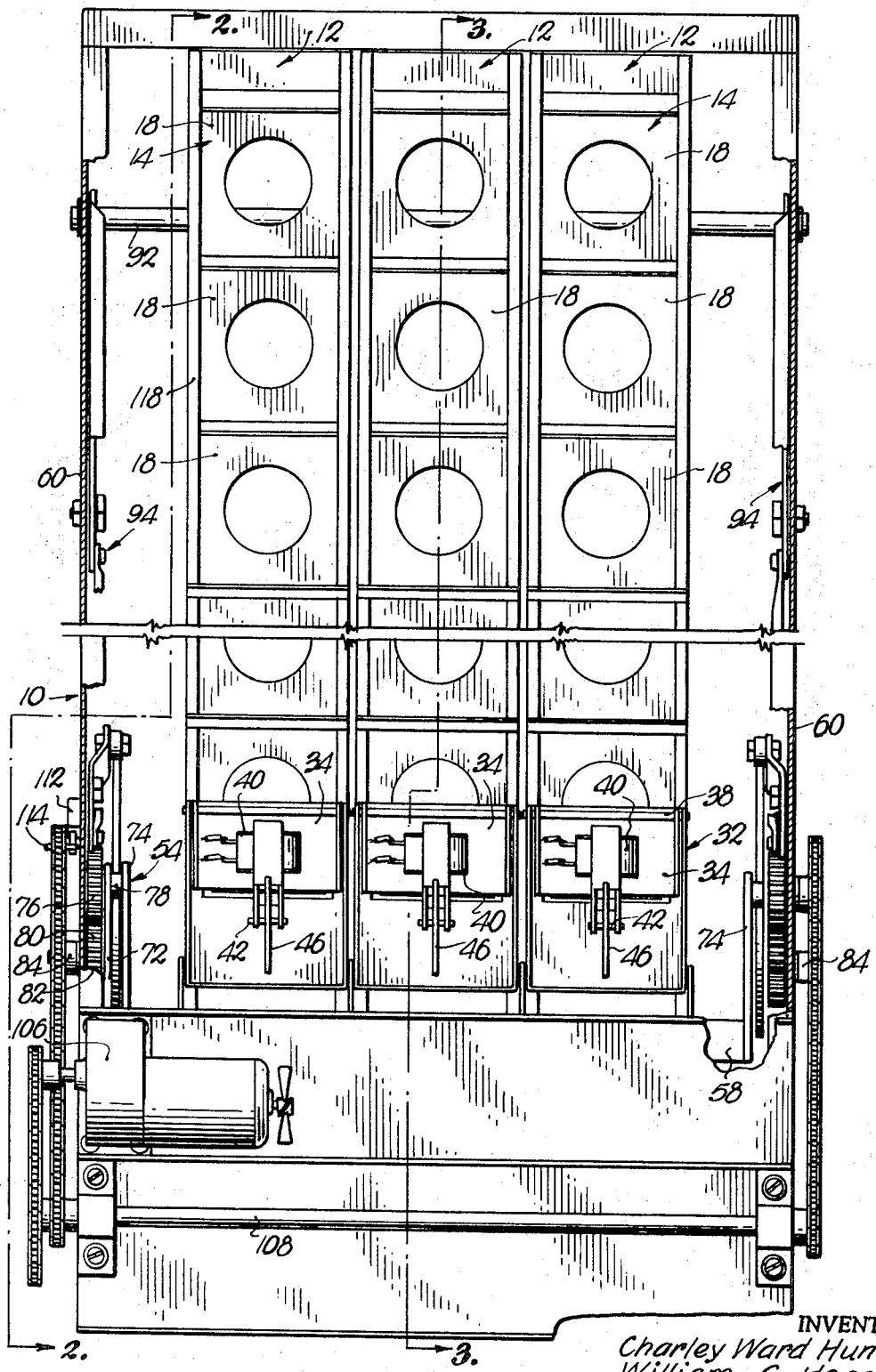
FIG. 1 is a fragmentary, front elevational view of a stacked compartment dispensing machine made pursuant to the present invention.
Figures 2, 5, 6:
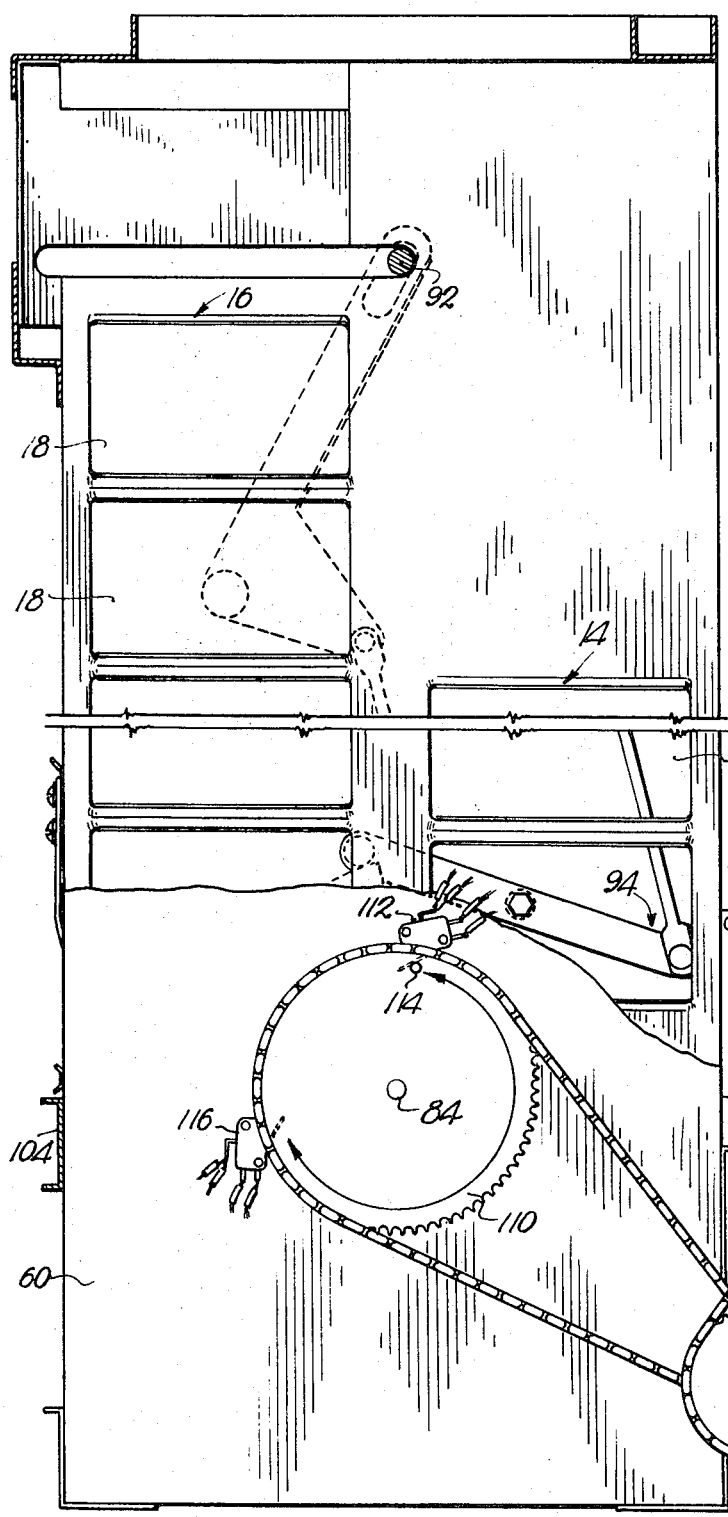
FIG. 2 is a fragmentary, vertical sectional view taken along line 2-2 of FIG. 1.
FIG. 5 is a perspective view of one of the individual compartments.
FIG. 6 is a fragmentary, detail view of the rear of the machine, illustrating the latch members.

The principles of the present invention are illustrated herein in connection with a dispensing or vending machine 10, the latter including a plurality of product conveyors 12 each having a front stack 14 and a rear stack 16 of individual, elongated, boxlike, vertically shiftable, horizontally disposed product compartments 18. Each compartment 18 (see particularly FIG. 5) has a solid bottom wall 20 with an aperture 22 formed therein for a purpose to be set forth hereinafter. The remaining walls may be open as shown to reduce the weight of the compartment, the construction thereof further including a crosspiece 24 spanning a pair of longitudinally extending top members 26 and rearwardly offset from a pair of upright front members 28.

Each of the front stacks 14 extends through a product access station which is preferably located near the top of the stacks 14 at the front of the machine, thus permitting a low profile design. As will be discussed, upon release of the lowermost compartment 18a of the stack 14 of one of the conveyors 12, the remaining compartments 18 thereabove will shift downwardly one step thus permitting the customer to remove the product from the appropriate compartment 18 at the product access station.

Selectively operable releasing means 32 is located at the bottom of the front stacks 14 to permit, upon actuation by the customer, the lowermost front compartment 18a of the selected conveyor 12 to gravitate downwardly. Releasing means 32 includes a pivotal plate member 34 associated with each stack 14 respectively, each member 34 having a lip 36 which underlies and engages the bottom 20 of the lowermost compartment 18a. The plate member 34 is hinged at 38 so as to be swingable toward and away from the position shown in full lines in FIG. 3 where the lip 36 supports the entire front stack 14. A solenoid actuator 40 for each plate member 34 normally maintains the latter in the stack-supporting position because of the engagement of the solenoid armature 42 thereof with a notch 44 in a fingerlike plate 46 that projects from each of the conveyors 12 directly below the corresponding plate member 34. Each plate 46 has a camming surface 48 against which the respective armature 42 acts when the plate member 34 is in the compartment-releasing position shown in broken lines in FIG. 3.

A shiftable transport structure 50 underlies all of the conveyors 12 for supporting one of the lowermost compartments 18a and carrying the latter from a position beneath the corresponding front stack 14 to a position where the compartment 18a underlies and supports the compartments 18 of the associated rear stack 16. Structure 50 includes a transport unit in the nature of a platform 52 for each of the conveyors 12, a mechanism broadly denoted 54 being employed to shift the platforms 52 rearwardly from compartment-receiving dispositions beneath the respective front stacks 14. The transport structure 50 is provided with an elongated, horizontally extending supporting bar 58 which underlies the conveyors 12 and is of inverted U-shaped configuration transversely thereof as is clear in FIGS. 3, 10, 11 and 13. Each of the platforms 52 is provided with a pair of opposed, depending side flanges 53 and is supported on the horizontal bight of an inverted U-shaped plate component 62, the legs or sides of each plate component 62 being secured to the bar 58. Thus, the plate components 62, which are spaced longitudinally along bar 58, provide upstanding supports for the respective platforms 52, connections between each platform 52 and its supporting component 62 being effected by elevating means comprising a pair of pins 66 carried by platform 52 and received within corresponding aligned slots 68 in the sides of the component 62. Each platform 52 has an upstanding lug 70 thereon which is adapted to mate with the aperture 22 in the bottom 20 of the compartment 18a.

As is particularly clear in FIGS. 10—13, each of the pins 66 spans the side flanges 53 of the respective platform 52 and thus extends through the two corresponding aligned slots 68 in the sides of the associated support component 62. It should be noted that each slot 68 has both an inclined portion and a horizontal portion, the corresponding pin 66 normally resting in the rearward end of the slot 68 at the bottom of the inclined portion thereof. A leaf spring 64 is mounted on the underside of the top or horizontal bight of each support component 62 and is disposed for engagement with the rear pin 66 carried by the respective platform 52 upon upward movement of the latter to bring the rear pin 66 into the horizontal portions of the corresponding aligned slots 68.

Mechanism 54 comprises a pair of identical assemblies adjacent respective sidewalls 60 of the machine housing, each assembly having a rotatable crank element 72 which is pivotally connected to the supporting bar 58 through a suspension arm 74 rigid with the proximal end of bar 58. Gear means 75 is associated with each of the crank elements 72 for maintaining the released compartment 18a in a horizontal attitude at all times as it is transferred. Each gear means 75 includes a first gear 76 rigidly secured to the arm 74 coaxially with the pivotal connection 78 of element 72 with arm 74. A second gear 80 is rotatably mounted on the element 72 and is in mesh with the first gear 76. A third gear 82 is mounted coaxially with a stub shaft 84 defining the rotative axis of the element 72 and is in mesh with the second gear 80. Gear 82 is rigidly secured to the adjacent sidewall 60 of the machine 10 and is thus held against rotation with the element 72.

Each shaft 84 has a cam 88 rigidly secured thereto for rotation with the associated element 72. A cam follower 90 engages the cam 88 and actuates an elongated, reciprocable pusher 92 upon shifting of the transport structure 50. Pusher 92 extends across the machine 10 adjacent the top thereof and is operable to force the topmost compartment of the rear stack 16 of a selected conveyor 12 to the uppermost position in the front stack 14 thereof. The motion of the cam followers 90 is transmitted to the pusher 92 through linkages 94. A spring 96 connected to each linkage 94 shifts the pusher 92 to the rear of the rear stacks 16 as the cams 88 permit.

Figure 7:
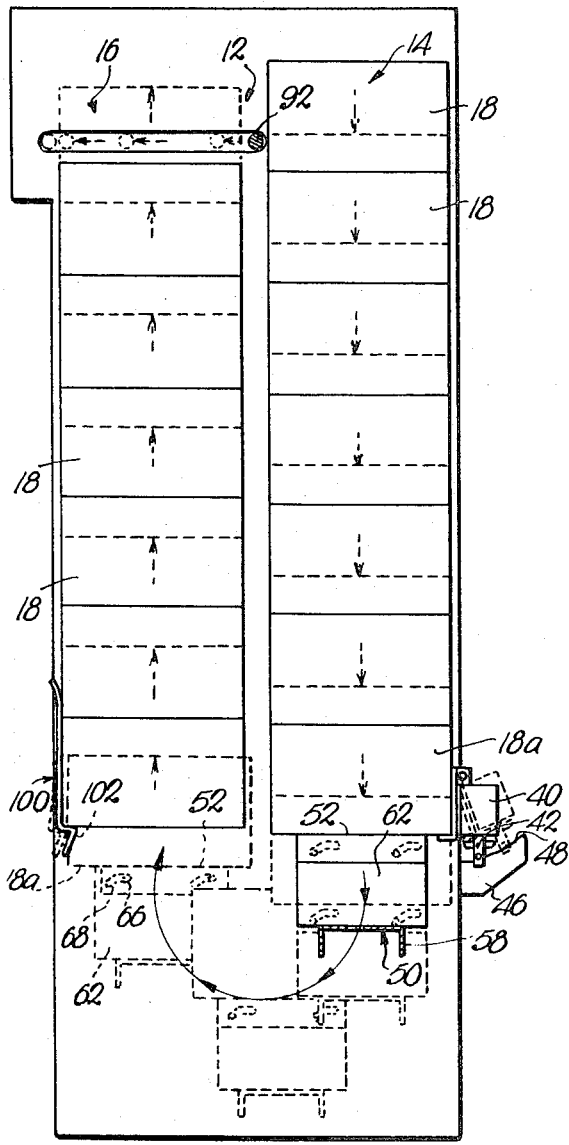
FIG. 7 is a diagrammatic view illustrating the operation of the machine.
Figure 8:
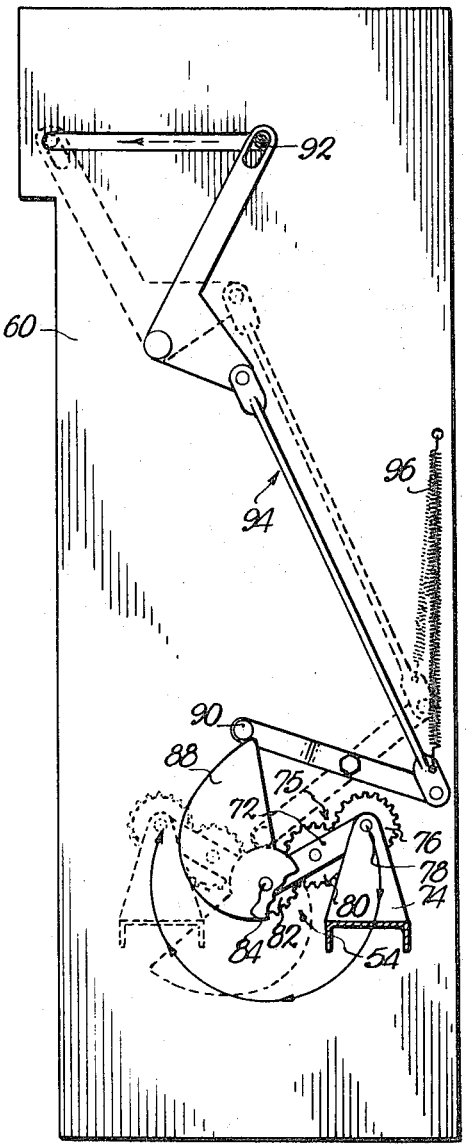
FIG. 8 is an elevational view on a reduced scale showing the transfer mechanism and the top compartment pusher structure.
Figure 9:
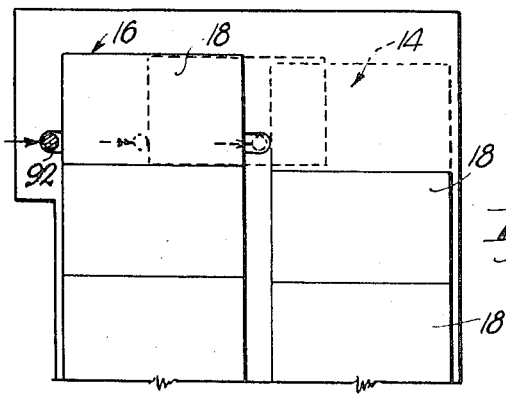
FIG. 9 is a fragmentary, diagrammatic view illustrating the transfer of one of the top compartments.

The transport structure 50 shifts the released compartment 18a to a position where it underlies and supports the compartments 18 of the associated rear stack 16, as illustrated in broken lines in FIG. 7. Retainer means 100 for the rear stacks 16 comprises a pair of shiftable, spring steel latch members 102 associated with each of the rear stacks 16 respectively. The latch members 102 for each stack 16 engage and catch beneath the lowermost compartment 18 (or 18a after transfer thereof) in order to support all of the compartments 18 of the stack 16 and prevent downward movement thereof. An elongated rear frame member 104 is rigidly secured to and spans the sidewalls 60 and is disposed just beneath the latch members 102 at the rear of the machine 10.

An electric motor 106 drives a shaft 108 which is coupled with a pair of sprockets 110 that are rigid with respective stub shafts 84. A stop and reversing switch 112 is mounted on one of the sidewalls 60 and is connected to the motor 106 for stopping the motor and reversing the connections thereto when the transport structure 50 has completed its cycle. A pin 114 projects from the sprocket 110 adjacent switch 112 for actuating the latter. A reversing switch 116 is spaced approximately 240° from switch 112 and is operated in a similar manner by pin 114 to reverse motor 106 during the cycle to terminate rearward movement of transport structure 50.

The compartments 18 of each of the conveyors 12 are carried in a pair of spaced, upright, interconnected frames 118 which are suspended from a horizontally telescoping supporting structure 120 for movement inwardly and outwardly of the machine 10 between an operative position within the machine 10 and a position spaced outwardly therefrom which permits ready access to the compartments 18 for cleaning and restocking thereof. The pairs of frames 118 are held in the operative position within the machine 10 by releasable fasteners (not shown).

OPERATION

Customer actuation of an appropriate selector switch (not shown) energizes a corresponding actuator 40 to release armature 42 from notch 44. The weight of the compartments 18 and 18a acting against the underlying lip 36 forces plate member 34 about the hinge 38 in a counterclockwise direction as viewed in FIG. 3, thereby releasing the lowermost compartment 18a. The actuator 40 is only momentarily energized, thus the armature 42 will immediately reengage the camming surface 48 (see the broken line illustration in FIG. 3) and the plate member 34 returns by gravity and a camming action to its stack-supporting position with the armature 42 reengaging the notch 44. Crosspiece 24, being offset from the front members 28 of the compartment 18a, permits the latter to gravitate downwardly even though the lip 36 has returned, thereby enabling the lip 36 to engage the bottom 20 of the next compartment 18 in the stack 14 as all of the front compartments 18 of the selected conveyor 12 shift downwardly one step. The released compartment 18a is received by the transport structure 50 which is at its standby position with platforms 52 immediately below the stacks 14. Aperture 22 of the compartment 18a receives the lug 70 of the underlying platform 52.

Figures 3, 4:
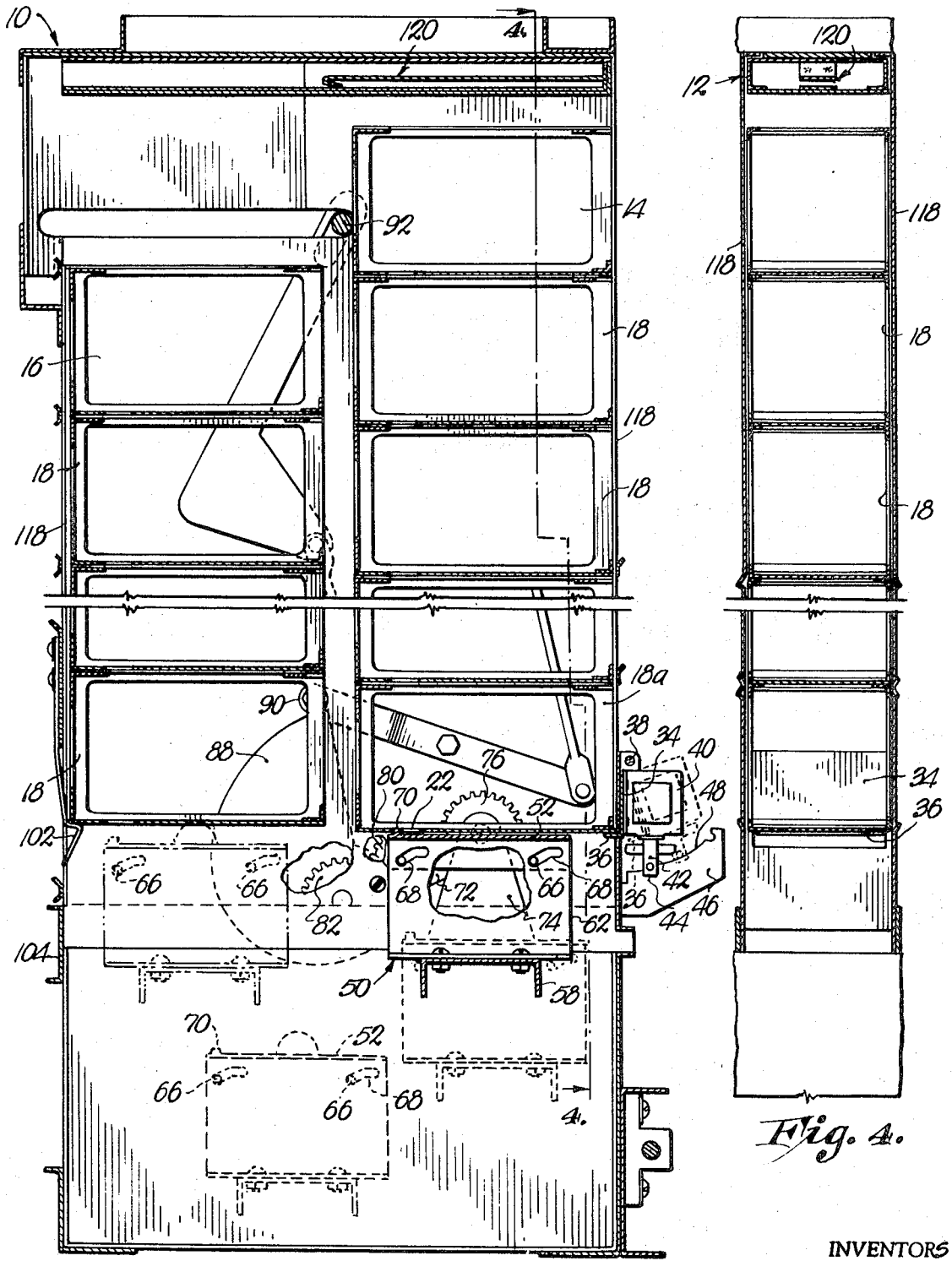
FIG. 3 is a fragmentary, vertical sectional view taken along line 3-3 of FIG. 1.
FIG. 4 is a fragmentary, vertical sectional view taken along line 4-4 of FIG. 3.
Figure 10:
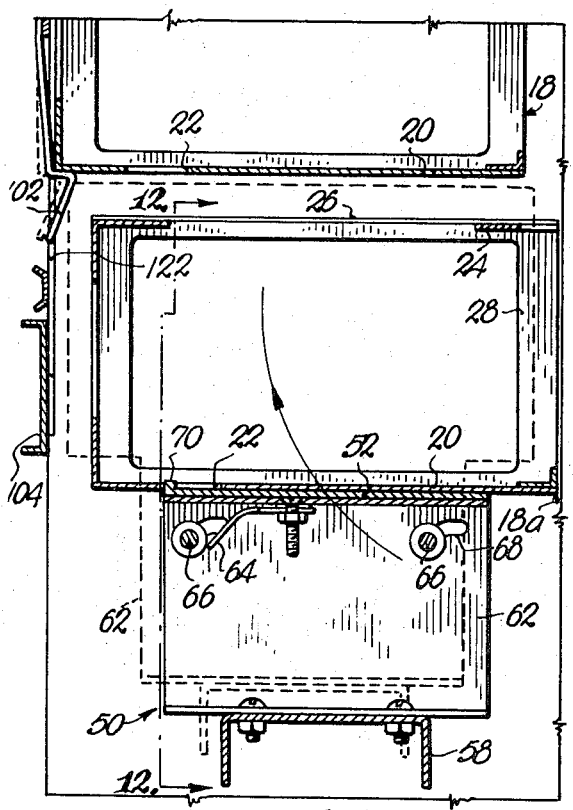
FIG. 10 is a greatly enlarged, fragmentary, vertical sectional view showing the bottom of one of the rear stacks and illustrating the transfer of a released compartment thereto.
Figure 11:
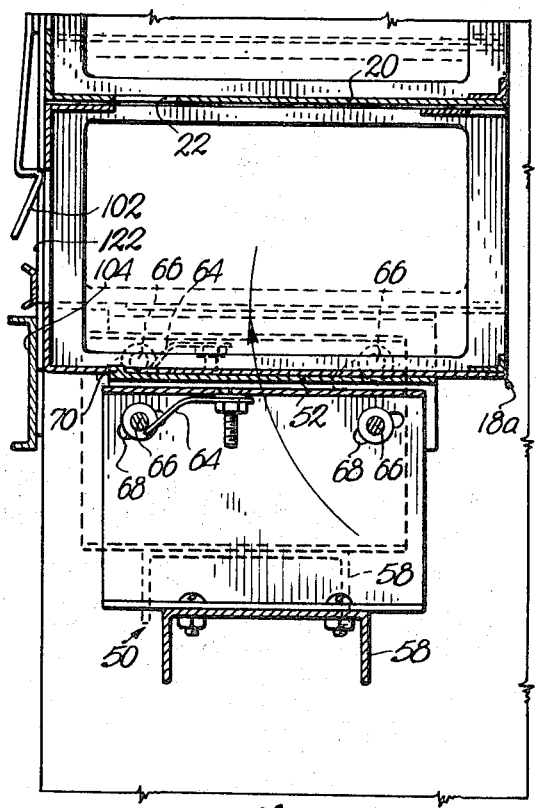
FIG. 11 is a view similar to FIG. 10 but showing the previously released compartment in a later stage of transfer at the time that the rear stack is being raised.
Figure 12:
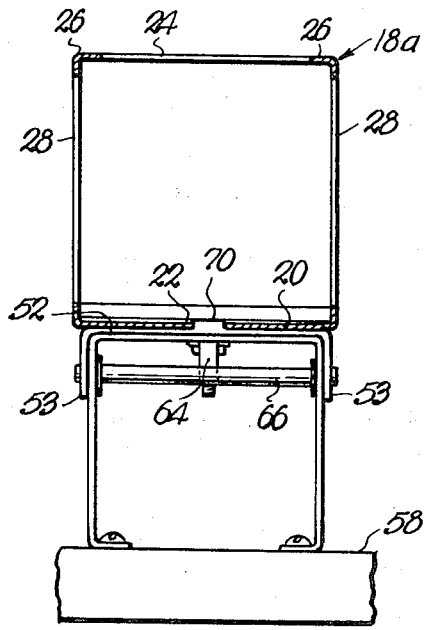
FIG. 12 is a vertical sectional view taken along line 12-12 of FIG. 10.
Figure 13:
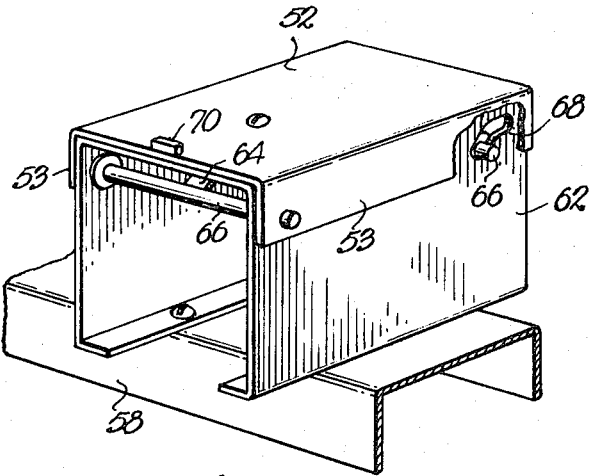
FIG. 13 is a greatly enlarged, perspective view of one of the compartment-receiving platforms and the supporting and elevating structure therefor.

Customer actuation of the selector switch also actuates suitable motor control circuitry (not shown) which energizes the motor 106, thereby rotating the shafts 84 and shifting the transport structure 50 as depicted by the broken line illustrations in FIGS. 3 and 7 and the detailed illustrations in FIGS. 10 and 11. The crank elements 72 rotate with the shafts 84 and thus carry the supporting bar 58 and the platforms 52 in an arcuate path indicated by the arrows in FIGS. 7, 8, 10 and 11. The bar 58, and therefore the platforms 52 mounted thereon, are maintained in a horizontal attitude at all times during the transfer by the gear means 75. Since all of the gears 76, 80 and 82 are of equal diameter and each gear 82 is fixed against rotation with its corresponding shaft 84, the arc swept by each element 72 rotating with the respective shaft 84 causes each gear 80 to rotate through an angular displacement equal to that swept by the element 72. Furthermore, rotation of the gears 76 will be equal to that of gears 80, thereby insuring that the bar 58 and, therefore, the platforms 52, will undergo relative rotation with the elements 72 to maintain the platforms 52 in a horizontal attitude. Since none of the gears 76 or 80 can be rotated without also rotating the shafts 84, and since the gears 76 are rigidly secured to the arms 74, the bar 58 cannot pivot with respect to the connections 78 unless shaft 84 is turned, thus locking the platforms 52 in a horizontal plane.

As the transport structure 50 moves along the path indicated by the arrows in FIGS. 7, 8, 10 and 11 with the compartment 18a of the selected conveyor 12 supported by the respective platform 52, the compartment 18a will at one point along the path of travel engage a pair of opposed, vertical guide rails 122 adjacent the member 104 formed by a pair of inturned flanges on the rear of the frames 118 housing the selected conveyor 12. Since the transport structure 50 is moving rearwardly when the compartment 18a engages the guide rails 122 (FIG. 11), pins 66 will be forced forwardly in slots 68 thus elevating the platform 52 carrying the compartment 18a a distance above the top of the support component 62, as best seen by comparison of FIGS. 10 and 11. The engagement of lug 70 with the notch effectively formed by aperture 22 provides a coupling that prevents compartment 18a from moving relative to platform 52. Only the platform 52 carrying the released compartment 18a will be elevated, the remaining platforms 52 remaining in their lowered positions. After engagement with the guide rails 122, the compartment 18a contacts the bottom 20 of the lowermost compartment 18 of stack 16, forcing all of the compartments in stack 16 up one step. At the same time, compartment 18a will force the latch members 102 outwardly into a nonlatching position (FIG. 11). Upon further movement of the transport structure 50, compartment 18a will be raised clear of the latch members 102, permitting the latter to return to a latching position beneath the compartment 18a. Since the platform 52 carrying the compartment 18a has been raised a distance above the level of the other platforms 52 by the action of its elevating means 66, 68, only the compartments 18 of the rear stack 16 to which the compartment 18a is transferred will be raised, thus permitting latching of the compartment 18a as just discussed without raising the compartments 18 of any of the other rear stacks 16.

When the transport structure 50 has moved to a position enabling the latch members 102 to engage the compartment 18a beneath the bottom 20 thereof, pin 114 activates switch 116 to reverse the motor 106 and shift the transport structure 50 back to its standby position beneath the stacks 14. During this return movement, each cam 88 rotates with the corresponding shaft 84 and drives pusher 92 across the top of the rear stacks 16 to its normal position, thereby moving the uppermost compartment 18 of the raised stack 16 to the uppermost position in the lowered stack 14. When transport structure 50 reaches its standby position beneath the front stacks 14, switch 112 deenergizes the motor 106 to terminate the operational cycle.

It is important to note that, when the pins 66 of the platform 52 supporting compartment 18a move forwardly in their slots 68 upon engagement of compartment 18a and the guide rails 122, the shifted pins 66 move into the horizontal portions of the slots 68 after traversing the inclined portions thereof. Therefore, it is assured that the shifted pins 66 will remain in their elevated positions in the respective slots 68 during raising of the rear stack 16, even though the full weight of the stack 16 is upon the platform 52. However, as is clear in FIG. 11, the rear pin 66 is forced against the leaf spring 64 as the pins 66 are shifted into the horizontal portions of the respective slots 68, the spring 64 serving to force the rear pin 66 rearwardly (and hence shift the platform 52 rearwardly and downwardly) during return movement of the transport structure 50 at the time that the platform 52 is lowered into clearing relationship to the stack 16 which it previously supported. In this manner, the elevated platform 52 is returned to its normal position as the transport structure 50 returns to standby beneath the front stacks 14.

Thus, it may be appreciated that the elevating means 66, 68 for the platforms 52 which raises only the rear stack 16 to which a compartment is being transferred, enables a much smaller motor 106 to be used than would otherwise be the case. The mechanism 54 insures that the platforms 52 are maintained in a horizontal attitude at all times during the transfer operation, thus eliminating tipping of the transferred compartment which, if permitted, could cause the machine to jam. Since the compartments are not tipped, tolerances between the compartments and the other parts of the machine which they contact are not critical, thereby providing further safeguard against the possibility of jamming.

We claim:
1. Article-handling apparatus comprising:
   an article conveyor having a pair of separate stacks of individual, vertically shiftable, horizontally disposed article compartments, the latter being successively movable to a location permitting ready access thereto upon incremental shifting of the compartments;
   means operably associated with one of said stacks for releasing the lowermost compartment thereof;
   shiftable transport structure for supporting the released compartment and carrying the latter to a position where the released compartment underlies and supports the compartments of the other of said stacks, and for maintaining the released compartment in a horizontal attitude at all times as the same is carried to said position, thereby preventing tilting of the released compartment as it is transported to said position;
   said structure having a compartment-receiving disposition beneath said one stack;
   mechanism coupled with said structure for shifting the latter downwardly from said compartment-receiving disposition with the released compartment supported thereon to move the released compartment clear of the remaining compartments of said one stack thereabove and cause the remaining compartments of said one stack to move downwardly one step, and for thereupon shifting said structure beneath said other stack and upwardly to move the released compartment into said position and raise said other stack one step; and
   movable means engageable with the uppermost compartment of said other stack after raising thereof for shifting the latter compartment to the top of said one stack.
2. Apparatus as claimed in claim 1:
   said structure including a platform for receiving said released compartment;
   said mechanism including a rotatable element movable along an arcuate path of travel, and means pivotally coupling said structure to said element with said platform generally horizontally disposed.
3. Apparatus as claimed in claim 2, said mechanism further including means coupled with said structure for maintaining the platform in said horizontal disposition as said element moves along said arcuate path.
4. Apparatus as claimed in claim 2:
   and a cam rotatable with said element;
   said movable means including a pusher reciprocable across the top of said other stack; and
   means including a cam follower operably interconnecting said cam and said pusher for actuating the latter in response to rotation of the cam.
5. Apparatus as claimed in claim 1:
   said structure including a generally horizontal platform for receiving said released compartment;
   said mechanism including a rotatable element movable along an arcuate path of travel and having a pivotal connection with said structure, a first gear rigidly secured to said structure and coaxial with said connection, a second gear rotatably mounted on said element and in mesh with said first gear, a third gear coaxial with the rotative axis of said element and in mesh with said second gear, and means holding said third gear against rotation with said element.
6. Apparatus as claimed in claim 1:
   said releasing means including a pivotal plate member having a lip engageable with said lowermost compartment of said one stack;
   said member being swingable toward and away from a position where said lip engages said lowermost compartment to support said one stack;
   said releasing means further including an actuator normally maintaining said member in said stack-supporting position and operable to release said member for movement away from said position to permit downward movement of said one stack.
7. Selectively operable article-handling apparatus comprising:
   a plurality of article conveyors each having first and second separate stacks of individual, vertically shiftable, horizontally disposed article compartments, the latter being successively movable to a location permitting ready access thereto upon incremental shifting thereof;
   selectively operable means operably associated with said conveyors for releasing the lowermost compartment of the first stack of a selected conveyor and permitting the remaining compartments of said first stack above the released compartment to move downwardly one step upon shifting of the released compartment out of support- ing relationship to said remaining compartments thereabove;

shiftable transport structure common to said conveyors and having a plurality of transport units beneath respective conveyors for supporting the released compartment and carrying the latter to a position where the released compartment underlies and supports the compartments of the second stack of the selected conveyor;

each of said units having a compartment-receiving disposition beneath the first stack of the respective conveyor;

mechanism coupled with said transport structure for shifting the units beneath said second stacks from said compartment-receiving dispositions thereof with the released compartment supported on the unit aligned with the selected conveyor, for then shifting said units upwardly to move the released compartment into said position and lift the second stack of the selected conveyor, and for thereafter shifting said units downwardly away from said second stacks;

retainer means engageable with the released compartment for supporting the latter and all of the compartments thereabove when said released compartment and all of those above have been raised through a displacement to move said released compartment a fixed distance above said position thereof;

said transport structure including elevating means operable to effect upward movement of only the unit supporting said released compartment through a vertical extent of travel at least equal to said fixed distance to cause the released compartment and those thereabove to be supported by said retainer means; and means engageable with the uppermost compartment of the second stack of the selected conveyor after raising thereof for shifting the latter compartment to the top of the first stack of the selected conveyor.

8. Apparatus as claimed in claim 7, said elevating means including a lifting device for each of said units respectively for imparting said movement through said extent of travel to the unit carrying the released compartment in response to said movement of the released compartment into said position by said upward shifting of the units.

9. Apparatus as claimed in claim 8:
said transport structure having a common support for said units beneath said conveyors;
each of said lifting devices comprising pin and inclined slot connections mounting the respective unit on said support;
each unit having means engageable with the released compartment when the latter is supported thereby for coupling the released compartment with the unit for movement together during shifting of the units beneath said second stacks and upwardly to lift the second stack of the selected conveyor;
guide structure for the released compartment cooperable with said connections for effecting actuation thereof and disposed adjacent the bottom of said second stacks; and
said mechanism, during said upward shifting of the units, effecting movement of the units along a path of travel to cause the released compartment to strike said guide structure and force the pins of the associated lifting device upwardly in the slots thereof to thereby impart said movement through said extent of travel to the unit carrying the released compartment.

10. Apparatus as claimed in claim 7:
said retaining means comprising a plurality of shiftable latch members each engageable with the lowermost compartment of the second stack of a respective conveyor for retaining the second stack against downward movement;
said released compartment clearing the latch member associated with the selected conveyor as the unit supporting the released compartment moves through said extent of travel; and
the last-mentioned latch member shifting to a locking position with respect to the released compartment as the latter clears the last-mentioned latch member, whereby the latter is permitted to assume its locking position without substantial interference and, upon said downward shifting of the units, the released compartment moves into locking engagement with the last-mentioned latch member and the compartments of the second stack of the selected conveyor thereby remain raised one step.

11. Apparatus as claimed in claim 7, said transport structure having means for maintaining the released compartment in a horizontal attitude at all times as the same is carried to said position, whereby to prevent tilting of the released compartment as it is transported to said position.

12. Apparatus as claimed in claim, said mechanism, during said shifting of the units beneath said second stacks from said compartment-receiving dispositions thereof, being operable to shift said units downwardly from said compartment-receiving dispositions with the released compartment supported on the unit aligned with the selected conveyor to move the released compartment clear of the remaining compartments of the first stack thereabove.

13. Selectively operable article-handling apparatus comprising:
a plurality of article conveyors each having first and second stacks of discrete article compartments successively shiftable to a location permitting ready access thereto;
selectively operable means associated with said conveyors for releasing the lowermost compartment of the first stack of a selected conveyor thereby causing the remaining compartments thereof to move downwardly one step upon shifting of the released compartment out of supporting relationship to the compartments thereabove;
retainer means biased to engage the lowermost compartments of the second stacks for supporting the latter;
shiftable transport structure common to said conveyors and having a corresponding number of platforms beneath the same for receiving the released compartment and transferring the latter to the lowermost position in the respective second stack;
elevating means operable to raise that platform, which is in the process of transferring the released compartment, above the level of the other platforms whereby the released compartment and the compartments of the respective second stack thereabove are raised sufficiently to permit engagement of the released, new lowermost compartment by said retainer means to support the respective second stack without lifting any of the other second stacks; and
means engageable with the uppermost compartment of the respective second stack after raising thereof for shifting the latter compartment to the top of the first stack of the selected conveyor.